United States Patent [19]

Huber

[11] Patent Number: 5,628,487
[45] Date of Patent: May 13, 1997

[54] FIXTURE FOR CAMOUFLAGE

[76] Inventor: John S. Huber, P.O. Box 835, Lakeville, Minn. 55044

[21] Appl. No.: 538,459

[22] Filed: Oct. 3, 1995

[51] Int. Cl.$^6$ ..................................................... A47F 7/00
[52] U.S. Cl. .......................... 248/314; 248/512; 248/513; 248/538; 114/351
[58] Field of Search ........................ 248/314, 315, 248/512, 513, 534, 538; 114/351; 411/424, 533

[56] References Cited

U.S. PATENT DOCUMENTS

| | | | |
|---|---|---|---|
| D. 221,278 | 7/1971 | Wright | 248/513 X |
| 264,622 | 9/1882 | Bush | 411/424 X |
| 335,190 | 2/1886 | Hannum | 114/351 |
| 466,960 | 1/1892 | Bert et al. | 248/538 |
| 1,264,446 | 4/1918 | Sears . | |
| 1,540,637 | 6/1925 | Kratzel . | |
| 1,568,607 | 1/1926 | Junkunc . | |
| 1,571,531 | 2/1926 | Spear . | |
| 2,126,457 | 8/1938 | East . | |
| 2,169,965 | 8/1939 | Niedermaier . | |
| 2,186,351 | 1/1940 | Stojaneck . | |
| 2,238,134 | 4/1941 | Schoen . | |
| 2,275,282 | 3/1942 | Bigham . | |
| 2,311,495 | 2/1943 | Krause . | |
| 2,387,009 | 10/1945 | Clarkson | 411/424 X |
| 2,550,023 | 4/1951 | Reilly . | |
| 2,826,845 | 3/1958 | Warren . | |
| 2,931,603 | 4/1960 | Johnston et al. . | |
| 3,085,774 | 4/1963 | Di Ienno | 248/512 |
| 3,193,852 | 7/1965 | Murrmann | 114/351 |
| 4,142,012 | 2/1979 | Clamage | 248/512 X |
| 4,161,768 | 7/1979 | Gauthier et al. . | |
| 4,485,579 | 12/1984 | Hawie | 248/512 X |
| 4,813,441 | 3/1989 | Kepley | 182/187 X |

Primary Examiner—Alvin C. Chin-Shue
Assistant Examiner—Richard M. Smith
Attorney, Agent, or Firm—Palmatier, Sjoquist, Helget & Voigt, P.A.

[57] ABSTRACT

A fixture for holding a natural material such as tree branches for the purposes of constructing a camouflage screen, the fixture utilizing a section of metal conduit bent into an acute angle, with a metal fastener crimped at the apex of the bend; the fastener can be an elongate wood screw or an elongate bolt having an angular bend along its length. The fastener is affixed to the apex of the conduit bend by a weldment.

7 Claims, 2 Drawing Sheets

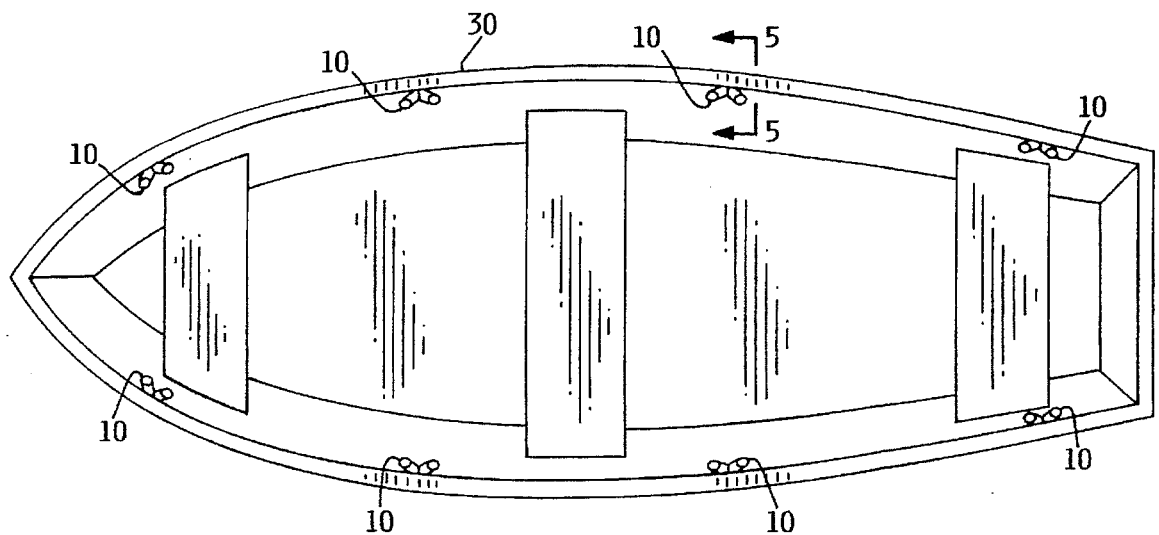
FIG. 4
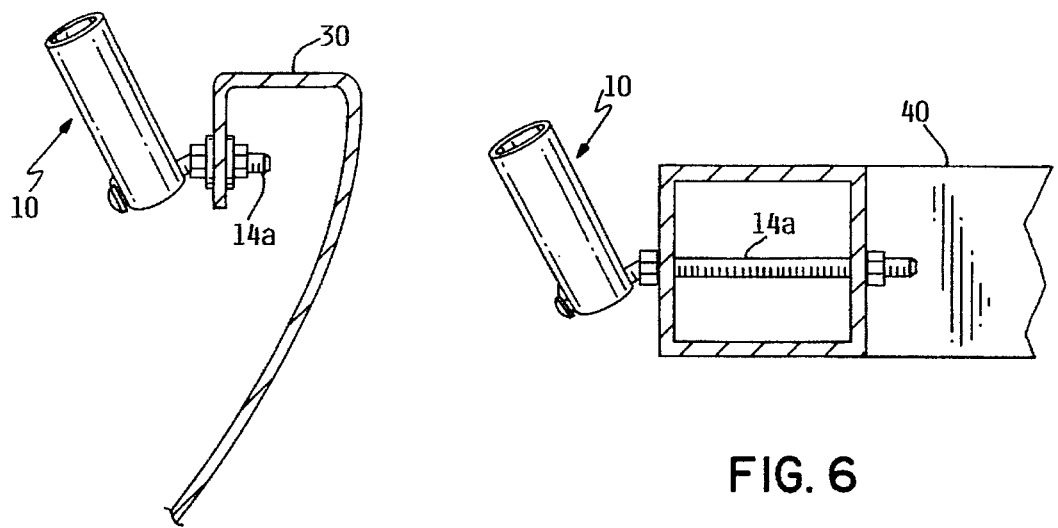
FIG. 5
FIG. 6

FIXTURE FOR CAMOUFLAGE

BACKGROUND OF THE INVENTION

The present invention relates to camouflage devices; more particularly, the invention relates to an apparatus for use in an outdoor environment when a person needs to conceal himself from wildlife and/or game. The invention finds particular utility in concealing a small boat and its occupants from sight by birds which may fly overhead. The invention is also useful for concealing a hunter supported on a tree stand at an elevated position in a tree.

In hunting or wildlife observation activities it is critical for the hunter/observer to be carefully concealed from sight from the wildlife, if the activities are to be successful. A sizable industry in the production of camouflage clothing has evolved to at least partially satisfy this need, and various camouflage covers and sheet material have also been developed. These materials are manufactured artificial devices with special coloring patterns which have been deemed to be closely representative of the general environment, and which tend to conceal the silhouette of the objects being covered. They must be transported to and from the observation site; and therefore, attempts have been made to manufacture such devices of lightweight material.

It is also possible to build a blind or camouflage nest from natural materials available at the observation site, which eliminates the need to transport extra materials to the site, and usually results in a superior concealment site because the material color and composition is taken from the immediate area and is, therefore, identical in coloration and consistency with the natural surroundings.

The present invention relates to an apparatus for simplifying and improving the construction of blinds and camouflage sites of the type which utilizes natural materials for construction.

SUMMARY OF THE INVENTION

A fixture for holding limbs and the like in a V-shaped configuration, having a fastener affixed at the apex of the "V" configuration; in one embodiment the fastener comprises an elongate screw for affixing to a tree, and in a second embodiment the fastener comprises a threaded bolt formed with an angular bend.

It is a principal object and advantage of the present invention to provide a fixture for constructing a camouflage screen utilizing natural materials found at the site of construction.

It is another object and advantage of the invention to provide a fixture for constructing a camouflage screen, wherein the fixture is small and portable, and may be removed from the site when the camouflage screen is no longer needed.

Other and further objects and advantages will become apparent from the following specification and claims, and with reference to the drawings.

BRIEF DESCRIPTION OF THE DRAWINGS

FIG. 4 shows a top view of a boat utilizing one embodiment of the invention;

FIG. 5 shows a cross-section view taken along the lines 5—5 of FIG. 4;

FIG. 6 shows a cross-section view of the apparatus mounted to a tree stand;

DESCRIPTION OF THE PREFERRED EMBODIMENT

Figure 1:
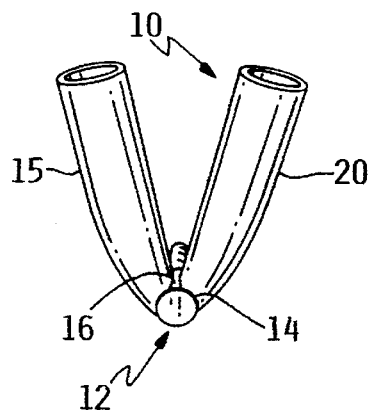
FIG. 1 shows a front view of the invention.
Figure 2:
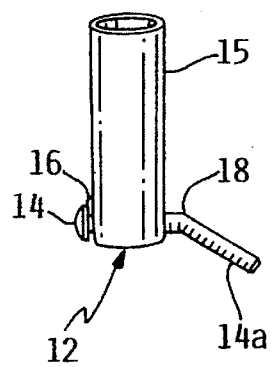
FIG. 2 shows a side view of one embodiment of the invention.
Figure 3:
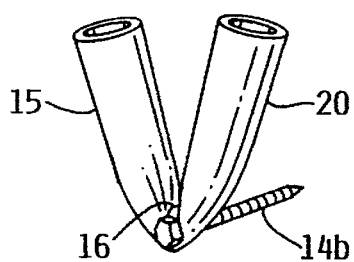
FIG. 3 shows an isometric view of another view of the invention.

Referring to FIGS. 1–3, the invention comprises a tubular member 10 having a bend at an apex 12. The tubular member 10 is formed into a first tubular arm 15 and a second tubular arm 20, of substantially equal lengths. During the bending process the tubular member 10 is first bent about a fixture to create a narrow channel for insertion of a fastener 14, and then the tubular member 10 is crimped tightly to tightly affix fastener 14 within the apex 12. After the bending process, a weldment 16 is applied to the interior of the apex 12 and to the fastener 14 to rigidly adhere fastener 14 to tubular member 10.

In one embodiment fastener 14 has a threaded shank 14a with an angular bend 18 along its length, wherein threaded shank 14a can accept one or more nuts to secure the tubular member 10 to another object. In a second embodiment fastener 14 has a screw-thread shank 14b for securing the tubular member to a tree or other wooden material. In this embodiment the shank 14b may or may not have a similar angular bend.

FIG. 4 shows a top view of a boat 30 on which a plurality of the tubular members 10 have been attached, preferably with the fasteners of the threaded shank 14a type. The tubular members are arranged about the perimeter of the boat at spaced intervals, with the tubular sections 15 and 20 inclined inwardly. FIG. 5 shows a cross section view taken along the lines 5—5 of FIG. 4, to better illustrate the inward inclination of each of the tubular members. With the inward bend of the tubular members as shown in FIGS. 4 and 5, the boat and its occupants may be concealed by inserting into the respective tubular sections various materials such as grasses, tree limbs, brush, etc. The inserted materials incline inwardly toward the center of the boat, thereby forming a natural arch wherein the occupants of the boat may remain seated beneath the arch. This type of coverage is useful because it is desirable to camouflage the boat and its occupants from view from the air.

FIG. 6 shows a typical mounting arrangement for use in connection with a tree stand 40. Tree stand 40 is typically formed from square tubular metal material in the form of a frame which may be removably attached to the trunk of a tree. In this case, it is desirable to camouflage the tree stand and its occupant from view from a position beneath the tree. Therefore, a number of tubular members 10 may be affixed to the tree stand frame 40 via the threaded shank 14a and suitable nuts, wherein the tubular members are inclined outwardly. If a sufficient number of these tubular members are affixed to the tree stand frame at spaced intervals, the hunter will be well shielded from observation from below and will have freedom of movement without interference with the outwardly inclined tree limbs and the like.

Figure 7:
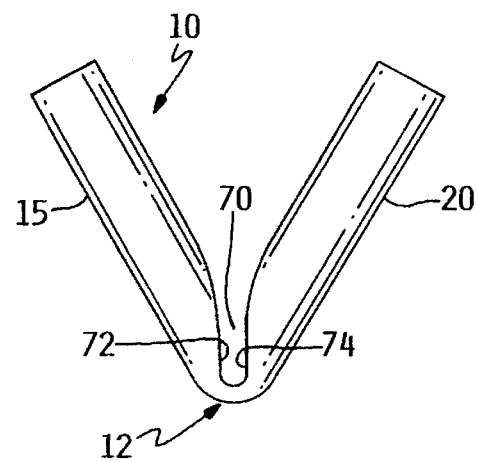
FIG. 7 shows the apparatus in a first step of construction.
Figure 8:
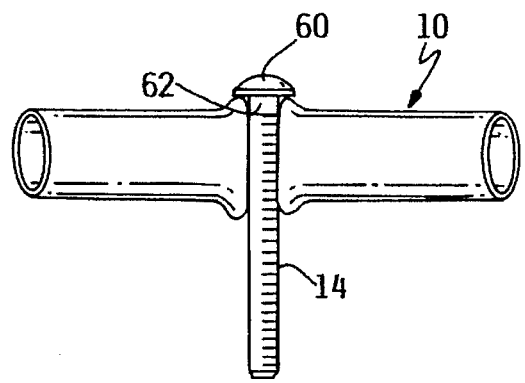
FIG. 8 shows the apparatus in a second stage of construction.
Figure 9:
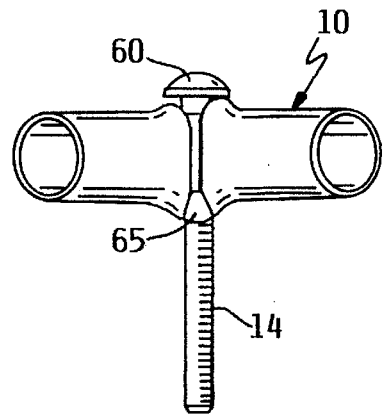
FIG. 9 shows the apparatus in a final stage of construction.

Experimentation has shown that the proper construction of tubular member 10 is extremely important to the satisfactory operation and use of the invention. The important construction steps are illustrated in FIGS. 7–9 and are described below. It has been found that a standard one-half inch electrical conduit is a very satisfactory material for use in forming the tubular arms 15 and 20. However, the electrical conduit must be crimped in a particular fashion in order to properly seat and secure the fastener. FIG. 7 shows the first step of construction wherein the tubular arm sections 15 and 20 are formed by crimping about an apex 12. The crimping process is arranged to provide a smooth radius of curvature about the lower portion of apex 12 and to provide a center channel 70 at the interior of the apex. Furthermore, the central channel 70 is arranged to have vertical wall sections 72, 74 which are spaced apart sufficiently to accommodate the insertion of a fastener 14. This step of the construction is best performed by using a jig or fixture having parallel sides equal to the width of the center channel 70 and then crimping the tubular member 10 about the jig or fixture to the position illustrated in FIG. 7.

After the construction step of FIG. 7 has been performed, a fastener 14 is dropped into the center channel 70. Particularly in the case of the threaded fastener, a carriage bolt having a rounded head 60 and a square section of shank 62 is preferable. The center channel 70 is sized to snugly accommodate the square shank section 62 so that the insertion of fastener 40 into the center channel 70 provides a snug fit, as illustrated in FIG. 8.

After the fastener 14 has been inserted into the channel 70, the tubular member 10 is further crimped as illustrated in FIG. 9, thereby bringing sections 15 and 20 closer together and forcing the channel 70 to close about the shank of the fastener 14. This final step of crimping provides a very tight and secure seating of the fastener 14 within the center channel 70. As a final step, it is preferable to apply a small welding braze 65 at the point where the fastener 14 emerges from the center channel 70, whereby welding the tubular member 10 directly to the fastener 14. This provides a completely rigid and immovable connection between these two members which will reliably function in extended use.

At the completion of the crimping operation illustrated in FIG. 9, it is preferable that the tubular sections 15 and 20 be spaced at an acute angle somewhat less than 90 degrees; and the best results have been realized when the acute angle of bend between these members is less than about 45 degrees.

In operation, one or more tubular members may be fastened as shown in FIG. 4 and FIG. 5, in the case of a boat camouflage situation. If the camouflage is to be used in conjunction with a tree stand in a tree, the fasteners may be directly screwed into the tree trunk at appropriate positions, or attached to the tree stand as shown in FIG. 6. After securing the fasteners, the camouflage operation is completed by inserting branches, reeds, grasses or other natural materials into each of the tubular sections so as to project outwardly therefrom, to develop a camouflage screen. The user may then position himself behind the screen so formed, to become hidden from view. Because the fasteners may be placed in any convenient position, it is possible to create a tree blind in any convenient location and design.

The present invention may be embodied in other specific forms without departing from the spirit or essential attributes thereof. It is desired that the disclosed embodiments be considered in all respects as illustrative, reference being made to the claims to indicate the scope of the invention.

What is claimed is:

1. An apparatus for building a camouflage structure for holding limbs and the like, comprising a tubular member having a bend of less than 90 degrees to form an apex, said apex comprising an outer curved surface and an inner channel; wherein said inner channel further comprises a lower curved surface and spaced apart walls; a fastener in said inner channel, said fastener having an enlarged head abutting said tubular member and a fastener shank extending outwardly from said channel; and a weldment affixing said fastener to said tubular member; said inner channel walls being formed in substantially parallel alignment and subsequently being crimped together about said fastener.

2. The apparatus of claim 1, wherein the tubular member further comprises a length of metal conduit of approximately one-half inch diameter.

3. The apparatus of claim 2, wherein the fastener further comprises an elongate wood screw having its head affixed to the tubular member by the weldment.

4. The apparatus of claim 2, wherein the fastener further comprises an elongate bolt having its head affixed to the tubular member by the weldment.

5. The apparatus of claim 4, wherein the fastener further comprises a shank having an angular bend proximate the tubular member.

6. The apparatus of claim 1, wherein said fastener further comprises a square shank portion adjacent said enlarged head, said square shank portion snugly fitting into said inner channel between said walls.

7. The apparatus of claim 6, wherein said weldment is applied to said fastener and said tubular member at the point of exit of said fastener from said inner channel.

* * * * *